(12) United States Patent
Mäkelä et al.

(10) Patent No.: US 7,596,392 B2
(45) Date of Patent: *Sep. 29, 2009

(54) METHOD AND SYSTEM FOR ARRANGING FREQUENTLY ACCESSED DATA TO OPTIMIZE POWER CONSUMPTION

(75) Inventors: Jakke Mäkelä, Turku (FI); Reza Serafat, Bochum (DE); Venkatesh Vadde, Fremont, CA (US)

(73) Assignee: Nokia Corporation, Espoo (FI)

( * ) Notice: Subject to any disclaimer, the term of this patent is extended or adjusted under 35 U.S.C. 154(b) by 735 days.

This patent is subject to a terminal disclaimer.

(21) Appl. No.: 11/065,241

(22) Filed: Feb. 23, 2005

(65) Prior Publication Data

US 2005/0143147 A1 Jun. 30, 2005

Related U.S. Application Data

(62) Division of application No. 10/199,271, filed on Jul. 18, 2002, now Pat. No. 7,072,637.

(51) Int. Cl.
*H04B 1/38* (2006.01)
(52) U.S. Cl. .................... 455/574; 455/572; 455/343.2; 455/343.1; 460/69; 460/78.01
(58) Field of Classification Search ................. 455/574, 455/572, 343.2, 343.1; 360/69, 78.01
See application file for complete search history.

(56) References Cited

U.S. PATENT DOCUMENTS

| | | | |
|---|---|---|---|
| 5,412,809 A | 5/1995 | Tam et al. ................... 395/750 |
| 5,452,277 A | 9/1995 | Bajorek et al. ................. 369/54 |
| 5,682,273 A | 10/1997 | Hetzler ........................ 360/75 |
| 5,687,382 A | 11/1997 | Kojima et al. ............... 713/320 |
| 5,787,292 A | 7/1998 | Ottesen et al. ......... 395/750.01 |
| 5,787,296 A * | 7/1998 | Grimsrud et al. ............ 713/320 |
| 5,854,720 A | 12/1998 | Shrinkle et al. ................ 360/69 |
| 6,052,347 A | 4/2000 | Miyata ........................ 369/54 |
| 6,282,046 B1 | 8/2001 | Houston et al. .......... 360/73.03 |
| 6,310,747 B1 | 10/2001 | Emo et al. ................ 360/97.02 |
| 6,400,892 B1 | 6/2002 | Smith .......................... 386/125 |
| 6,512,652 B1 * | 1/2003 | Nelson et al. ............. 360/78.01 |
| 6,523,094 B2 | 2/2003 | Kimura et al. .............. 711/137 |
| 6,622,252 B1 | 9/2003 | Klaassen et al. ............. 713/320 |
| 6,728,177 B2 | 4/2004 | Seong et al. ................ 369/47.4 |
| 2002/0186492 A1 * | 12/2002 | Smith .......................... 360/69 |
| 2003/0117916 A1 | 6/2003 | Makela et al. ............... 369/53.2 |
| 2003/0218820 A1 | 11/2003 | Koizumi et al. ............... 360/75 |

\* cited by examiner

*Primary Examiner*—Sanh D Phu
(74) *Attorney, Agent, or Firm*—Harrington & Smith, PC

(57) ABSTRACT

A method and system for optimizing energy consumption during data file read/write operations in a battery powered disk-based memory system is provided.

21 Claims, 6 Drawing Sheets ated track radii $R_0 \ldots R_m$# METHOD AND SYSTEM FOR ARRANGING FREQUENTLY ACCESSED DATA TO OPTIMIZE POWER CONSUMPTION

CROSS-REFERENCE TO RELATED APPLICATIONS

The present application is a divisional of and claims the benefit of U.S. patent application Ser. No. 10/199,271, filed on Jul. 18, 2002 now U.S. Pat. No. 7,072,637.

BACKGROUND OF THE INVENTION

1. Field of the Invention

The present invention relates to data storage and, more particularly, to optimizing data storage for frequently accessed files in a mobile terminal disk-based memory, in order to minimize power consumption during file access.

2. Prior Art

With regard to storage devices in mobile terminals, solid-state flash cards are the most commonly used technology. However, the cost per storage area is relatively high when compared with high capacity disk based memory systems. On the other hand, a disadvantage with disk-based storage systems is the high power drain due to factors such as the combined power needed to rotate the memory disk and, at the same time, actuate the disk heads. It will be appreciated that this disadvantage is exacerbated in power-limited devices such as battery-powered mobile phones and other battery powered devices.

Therefore, it is desirable to provide a method and system to optimize data object placement in a disk-based memory system so that power consumption is minimized when accessing desired data files, thereby extending battery life.

SUMMARY OF THE INVENTION

The foregoing and other problems are overcome, and other advantages are realized, in accordance with the presently preferred embodiments of these teachings.

In accordance with one embodiment of the present invention a method for conserving battery power in a battery powered memory device is provided. The method includes operating the battery powered memory device in a battery-powered mode, and gathering at least one metric associated with retrieving a first data file. The method also includes operating the battery powered memory device in a non-battery powered mode, wherein operating the battery powered memory device in the non-battery powered mode includes determining a first power efficient location in the battery powered memory device, and storing the first data file in the first power efficient location.

In accordance with another embodiment of the invention a device is provided. The device includes a memory having a disk-based memory system adapted to optimize power consumption P during data file write/read operations, wherein optimization is based in part on the number of times a data file is expected to be accessed.

In accordance with another embodiment of the invention a method for optimizing battery power is provided. The method includes analyzing at least one first data file metric associated with a first data file and analyzing at least one second data file metric associated with a second data file. The method also includes estimating a first and second battery power consumption for memory storage/retrieval of the first and second data file, respectively. Estimating the first and second battery power consumptions further includes making the first and second battery power consumption estimates based at least partially on the at least one first data file metric and the at least one second data file metric, respectively. The method includes organizing on a memory device the first and second data files in accordance with the first and second battery power consumption estimates.

In accordance with another embodiment of the present invention a program storage device readable by a machine, tangibly embodying a program of instructions executable by the machine to perform conserving battery power in a battery powered memory device is provided. The program includes operating the battery powered memory device in a battery-powered mode, and gathering at least one metric associated with retrieving a first data file. The program also includes operating the battery powered memory device in a non-battery powered mode, and determining a first power efficient location in the battery powered memory device; and storing the first data file in the first power efficient location.

The invention is also directed towards a method for optimizing energy consumption during an optimization mode in a mobile device. The method includes providing a disk-based memory having a plurality of recordable tracks and associated track radii $R_0 \ldots R_m$ and determining a data file metric associated with a data file. The track on the disk may alternatively be arranged as a single consecutive spiral or several such consecutive spirals. For clarity, the same formalism is used for all embodiments, so that "track" refers to either a specific discrete track with radius R, or a location on a continuous track such that the beginning of the file has radius R. The method selects in accordance with the data file metric, an energy-optimum recordable track from the plurality of recordable tracks. The method also includes defragmenting the data file and writing the data file on the selected energy-optimum recordable track.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
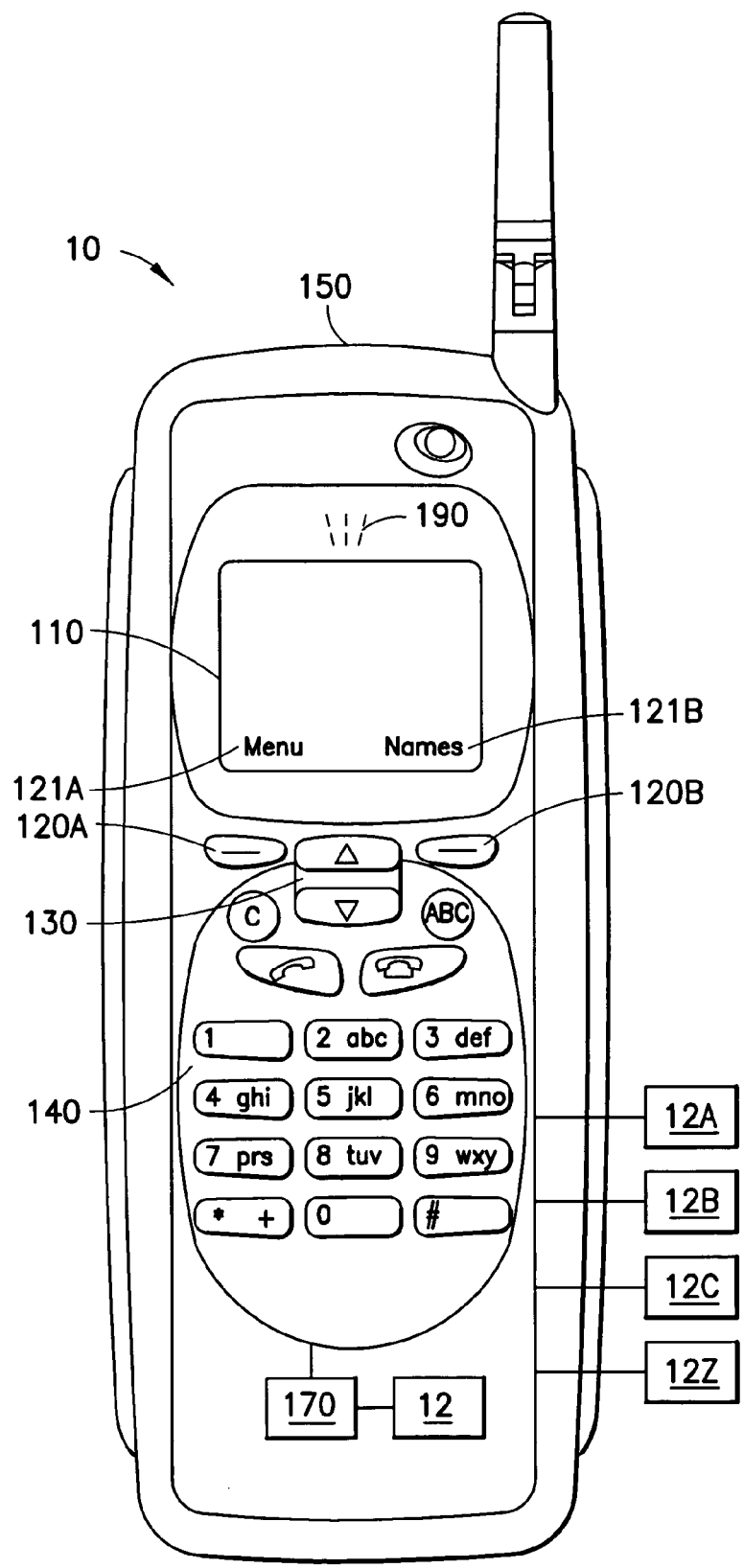
FIG. 1 is a perspective view of a mobile station incorporating features of the present invention.

Although the present invention will be described with reference to several embodiments shown in the drawings, it should be understood that the present invention can be embodied in many alternate forms of embodiments.

The usability of the file allocation optimization teachings described herein can include two working modes; namely, a working mode and an optimization mode. The working mode is assumed to be the normal usage case, when the user carries the mobile device and the device is not plugged to any power supply facility. In this case the mobile device, or any suitable device, will work as usual and only registers the needed file access frequency information in the FAT (or a mirror of it). In a preferable embodiment, the optimization mode is reserved for the case that the device is plugged to a power supply facility (e.g. charger). During this period the file allocation optimization will be started automatically to improve the file allocation and defragmentation.

Referring to FIG. 1 there is shown a pictorial representation of a Mobile station 10 incorporating features of this invention. Mobile station 10 includes a display 110 that displays data, menus and areas for softkey functions 121A and 121B that can be activated by pressing of softkeys 120A and 120B. Scroll keys 130 are also provided to scroll through menu items featured on display 110. Scroll keys 130 may also be a rolling cylinder, ball or the like which will allow for scrolling through items displayed. Keyboard 140 operates for the input of data. The keys of keyboard 140 may also be illuminated by various methods known to those skilled in the art to produce a visual reminder in response to an event. Entry of data may be facilitated by the use of predictive keyboard entry that is known by those skilled in the art. Data is stored in a memory 12. Memory 12 may include volatile Random Access Memory (RAM) including a cache area for the temporary storage of data. Mobile station 10 may also include non-volatile memory 12A, which may be embedded or removable. Non-volatile memory 12A may be EEPROM, flash memory, or NVRAM technology, such as FeRAM and the like. The mobile station 10 also includes a disk-based memory device 12C wherein data objects, particularly multimedia data objects are stored in accordance with the teachings of this invention in order to optimize power consumption.

Figure 2:
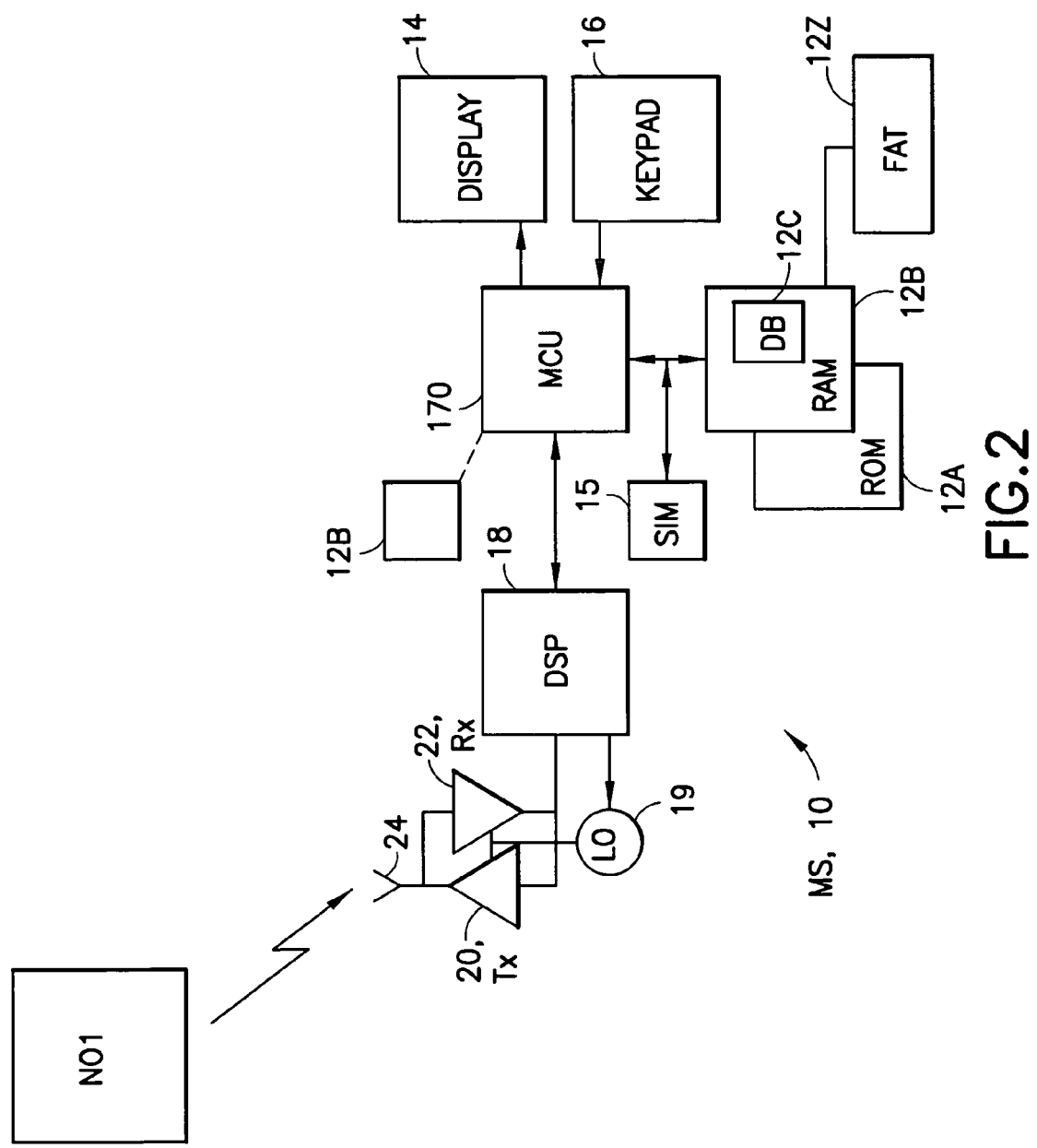
FIG. 2 is a block diagram of the mobile station shown in FIG. 1 that is constructed and operated in accordance with this invention.

Referring to FIG. 2, therein is illustrated a simplified block diagram of an embodiment of mobile station 10 that is suitable for practicing this invention. FIG. 2 also shows a network operator (NO1), also referred to herein simply as a first system, that transmits in a forward or downlink direction both physical and logical channels to the mobile station 10 in accordance with a predetermined air interface standard or protocol.

The mobile station 10 includes a micro-control unit (MCU) 170 having an output coupled to an input of a display 14 and an input coupled to an output of a keyboard or keypad 16. The mobile station 10 may be considered to be a radiotelephone, such as a cellular telephone or a personal communicator having voice and/or packet data capabilities, or it may be a wireless packet data terminal. The mobile station 10 contains a wireless section that includes a digital signal processor (DSP) 18, or equivalent high-speed processor, as well as a wireless transceiver comprised of a transmitter 20 and a receiver 22, both of which are coupled to an antenna 24 for communication with the currently selected network operator. Some type of local oscillator (LO) 19, which enables the transceiver to tune to different frequency channels when scanning and otherwise acquiring service, is controlled from the DSP 18. The MCU 170 is assumed to include or be coupled to the read-only memory (ROM) 12A for storing an operating program, as well as the random access memory (RAM) 12B for temporarily storing required data, scratchpad memory, etc.

A portion of the RAM 12B may be non-volatile, enabling data to be retained when power is turned off. A separate removable SIM 15 can be provided as well, the SIM storing, for example, subscriber-related information.

The mobile station 10 also includes a File Allocation Table (FAT) 12z for storing information related to the data objects stored and retrieved in disk based memory device 12B in accordance with the teachings presented herein.

Figure 5A:
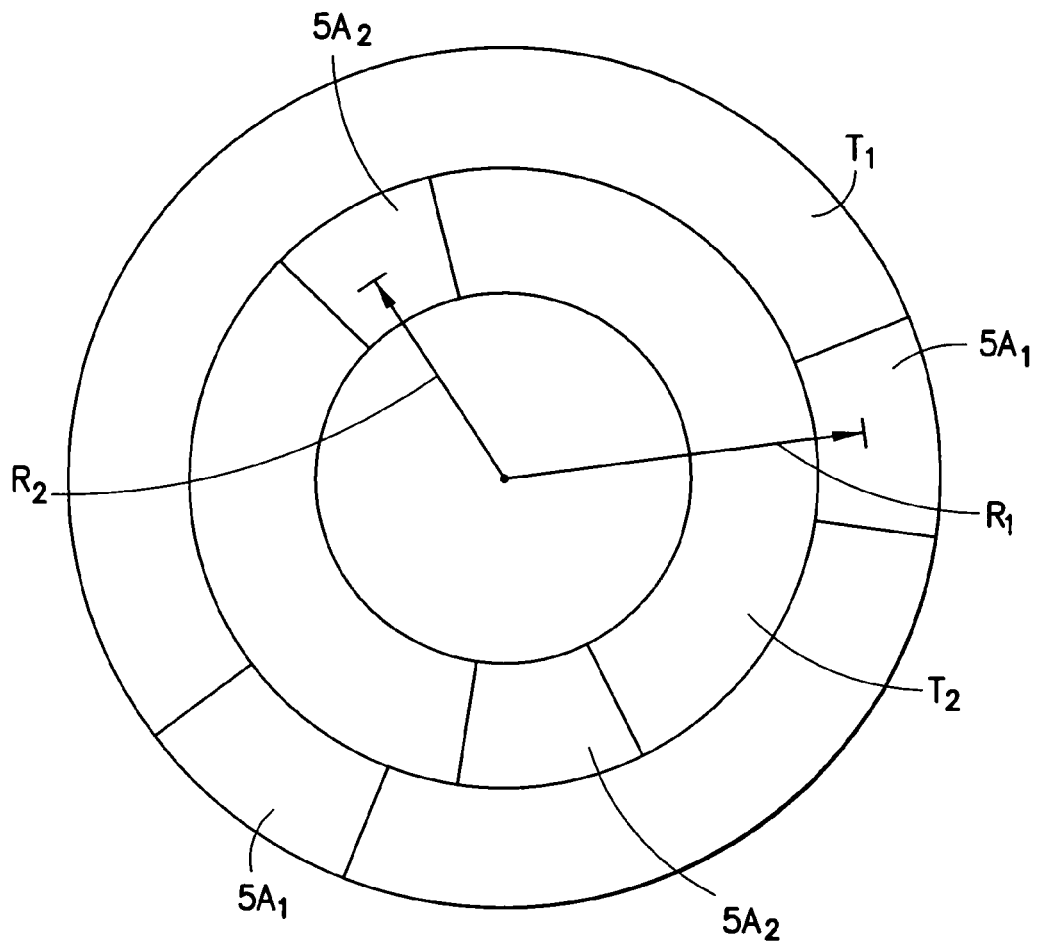
FIGS. 5A-5C are pictorial diagrams of multiple symmetrical recordable tracks and a spiral recordable track, respectively, and associated recordable segments incorporating features of the present invention shown in FIG. 1.
Figure 5B:
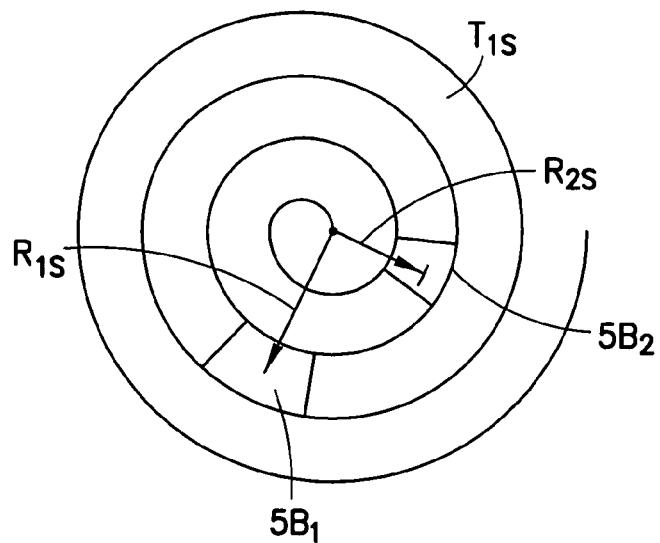
Figure 5C:
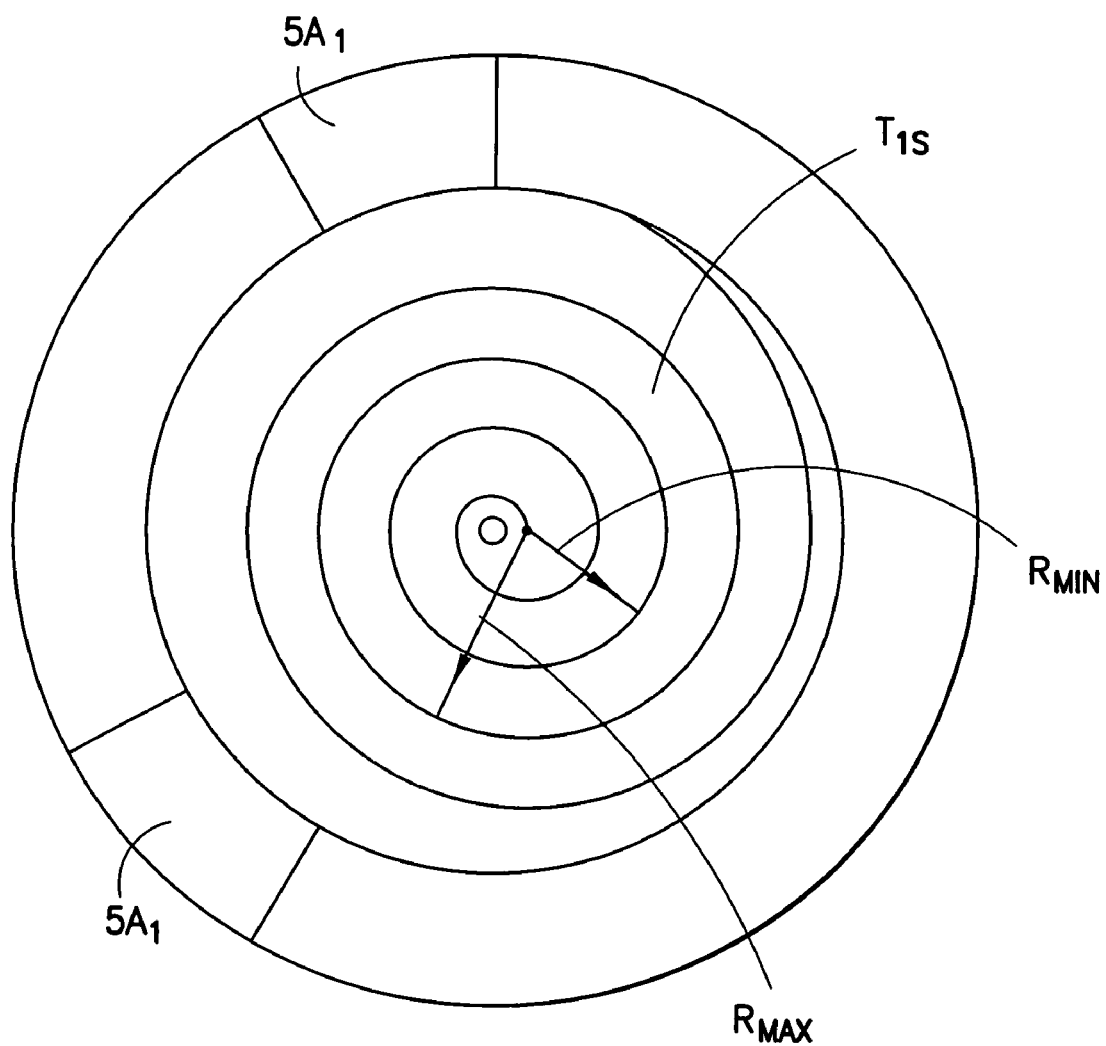

Referring also to FIGS. 5A-5C, R is defined to be the radius (the distance from the center of the disk) to where a data file is stored on a track of the disk-based memory device 12C. In order to optimize power consumption during file retrieval, a corresponding optimal range for R is determined in accordance with the teachings of the invention. In alternate embodiments R may correspond to the radius of particular track segments within a track as shown in FIG. 5A, items 5A1 and 5A2 (i.e., $R_0 \ldots R_m$ corresponding to tract segments $TS_0 \ldots TS_m$). Referring also to FIG. 5B, R may correspond to a particular track segment such as 5B2 in spiraling track $T_{1S}$. Referring to FIG. 5C, it will be further appreciated that an alternate embodiment may include tracks 5A1 at fixed radii as well as one or more spiral tracks $T_{1S}$. In embodiments with spiraling tracks the track position may be characterized by $R_{min}$ and $R_{max}$, indicating the track start/stop position on the disk. Spiraling track $T_{IS}$ may be any suitable spiraling track such as, for example, a symmetrical spiraling track or mathematically derived spiral track such as a logarithmic spiral track. It will be appreciated that alternate embodiments may include a plurality of spiraling tracks.

TABLE A

| | |
|---|---|
| s | Throughput (bits/s) |
| σ | Linear bit density of the disk (bit/mm) |
| ω | Rotating speed of the disk (rpm) |
| r | Radius (mm) |
| τ | Time used to read a file (sec); typically τ << T (see below) |
| P | Power consumption (mW) |
| κ | Dependence of power on ω: $P = \omega^\kappa$. Default value 3. |
| Ψ | Energy expended (mJ) |
| L | Length of file (bits) |
| T | Maximum allowed time to read clip (sec) |
| Γ | Empirically determined exponent |

In addition to the parameters defined in Table A, the following assumptions are made:

1. The data files are referred to by the index j, j=1:N. The file with index 1 is the one that is located nearest to the center of the disk; the others are in consecutive order towards the edge. The files may be either contiguous, or there may be gaps between them. The system with gaps is a preferred embodiment, but the invention is not limited to that case.

2. The disk preferably has constant linear bit density σ [bits/mm].

3. The data files are assumed to have lengths $L_j$ [bits] that are much smaller than the entire capacity of the disk. With this approximation, each file can be approximated to be a distance $R_j$ [mm] from the center.

4. At a given angular rotation speed ω [rotations/sec], the number of bits per second read is given by $s_j = \sigma \omega R_j$.

5. Assuming that the bit rate is approximately constant during the reading of the file, the time to read the file is $T_j = L_j/s_j = L_j/\sigma \omega R_j$.

In general, the power consumption of a disk drive as function of the rotation speed ω is given by a function P(ω) Also, in the general case, a disk throughput relationship may be defined as $s(\omega,r) = \sigma(r)\omega(r)r$.

The power profile may then be represented by:

$$\psi(\omega, r) = P(\omega(r))L/s(\omega, r) = \frac{P(\omega(r))}{r\sigma(r)\omega(r)}L \equiv \xi(r)L \quad \text{(Eq. 1)}$$

In one embodiment, the teachings of the present invention are applicable to constant linear velocity (CLV) disk systems. In alternate embodiments the teachings are combined with an angular velocity (AV) disk system, such as, for example, a constant angular velocity (CAV) disk system. Many modern disk systems follow a CAV strategy or a more complicated zoning system based on CAV. The teachings of the invention will be described and made clear with reference to these alternate embodiments.

In the general case, the energy consumption to read the file is the product of the time spent reading the file and the power consumption during the readout. In the general case, $$E(F_j) = T_j \sum_i a_i \omega^{k(i)-1} = L_j \sum b_i R_j^{-k(i)} \quad \text{(Eq. 2)}$$

The units and formulations have been chosen to make future calculations easier. The terms k(i)–1 can be either integers or fractional. Equation 2 is the generic formulation of the power consumption; in alternate embodiments its exact form may be different and is preferably determined empirically.

When k(i)–1=i for all i, the Equation 2 is the Taylor series of the energy profile. However, the equation is more general than the Taylor series in that it can also take non-linearity into account. These non-linearities are preferably determined empirically.

It will be appreciated that Equation 2 applies to CLV and CAV embodiments as well as CLV/CAV hybrids. In the case of CAV, Equation 2 is preferably suited to the acceleration stage, after which the energy becomes predominantly stable; i.e. the term $a_1$ dominates. Thus, the general case of Equation 2 advantageously describes any suitable energy profile.

The derivative of Equation 2 is:

$$\frac{\partial E}{\partial R} = -L_j \sum b_i k(i) R_j^{-k(i)-1} \quad \text{(Eq. 3)}$$

Thus, since E is monotonically increasing, the resulting derivative of Equation 2, i.e., Equation 3, is negative. Therefore, moving or storing a file outward, in accordance with the teachings of the present invention, generally results in decreased power consumption. It should be noted that in some instances (e.g. using pulsing mechanisms, or gear systems) that E may not increase monotonically, thereby providing a non-negative derivative or a pathological anomaly. However, these pathological anomalies, in general, act as a small perturbation on the average power consumption derived from the normal case and need not be discussed here.

A teaching of the present invention optimizes energy consumption (i.e., decrease energy consumption) by associating an access parameter $n_j$ for each file in the File Allocation Table (FAT) (FIG. 2, item 12z), where the access parameter is incremented, or modified, each time the file is accessed. Thus, the total power expended for retrieving a certain file may be expressed as the power expended per each access time multiplied by the number of access times or $$P_j = T_j \sum_i a_i \omega^{k(i)-1} = n_j L_j \sum b_i R_j^{-k(i)} \quad \text{(Eq. 4)}$$

In addition, file ordering may be written as a vector Ord_zero={1,2,3, ... }. The optimal file arrangement within the storage medium is then the permutation Perm(Ord_zero) which minimizes the total P.

It will be appreciated that in alternate embodiments any suitable parameters may be associated with a file. For example, the order Ord_zero and a vector of pointers to the actual location on the disk Loc_zero={R1*,R2*, ... } where Ri* is a pointer to the location of the file (from which the distance to the center R can be derived). Thus, advantageously optimizing not only the order of the files, but also the precise placement of the files within the storage medium. Other parameters may include the length of the file and in alternate embodiments the time to read the file, as taught in co-pending application Ser. No. 10/012,801, filed Dec. 7, 2001, and hereby incorporated by reference in its entirety.

In alternate embodiments where the access parameter is predetermined, the methods taught below may be used to determine the optimal placement before the file has been accessed for the first time.

The access parameter $n_j$ may be determined dynamically, or in alternate embodiments, the parameter may be determined a priori, or a combination of the two embodiments. For example, the access parameter may be pre-assigned a predetermined base number (i.e., default $n_j$=1) and then incremented (or decremented) when the file is actually accessed. The access information can be available directly through knowing the file extension and the usage patterns, or by some other means. As an example, it is known that the mailbox file will be accessed and modified each time the user receives mail. Thus, it is possible to set a very high value of $n_j$ for that file.

Also, in a preferable embodiment the access parameter $n_j$ is independent of file name changes (i.e., $n_j$ is not reset to a new value because of a file name change). Also, in a preferable embodiment $n_j$ tracks data file access as well as file name changes.

The teachings described herein are independent of the details of the file allocation system. However, in a preferable embodiment file fragmentation is minimized by including unallocated space between files. Further, optimization enhancements may be gained by dynamically defragmenting files during or before the optimization stage presented herein.

Figure 3:
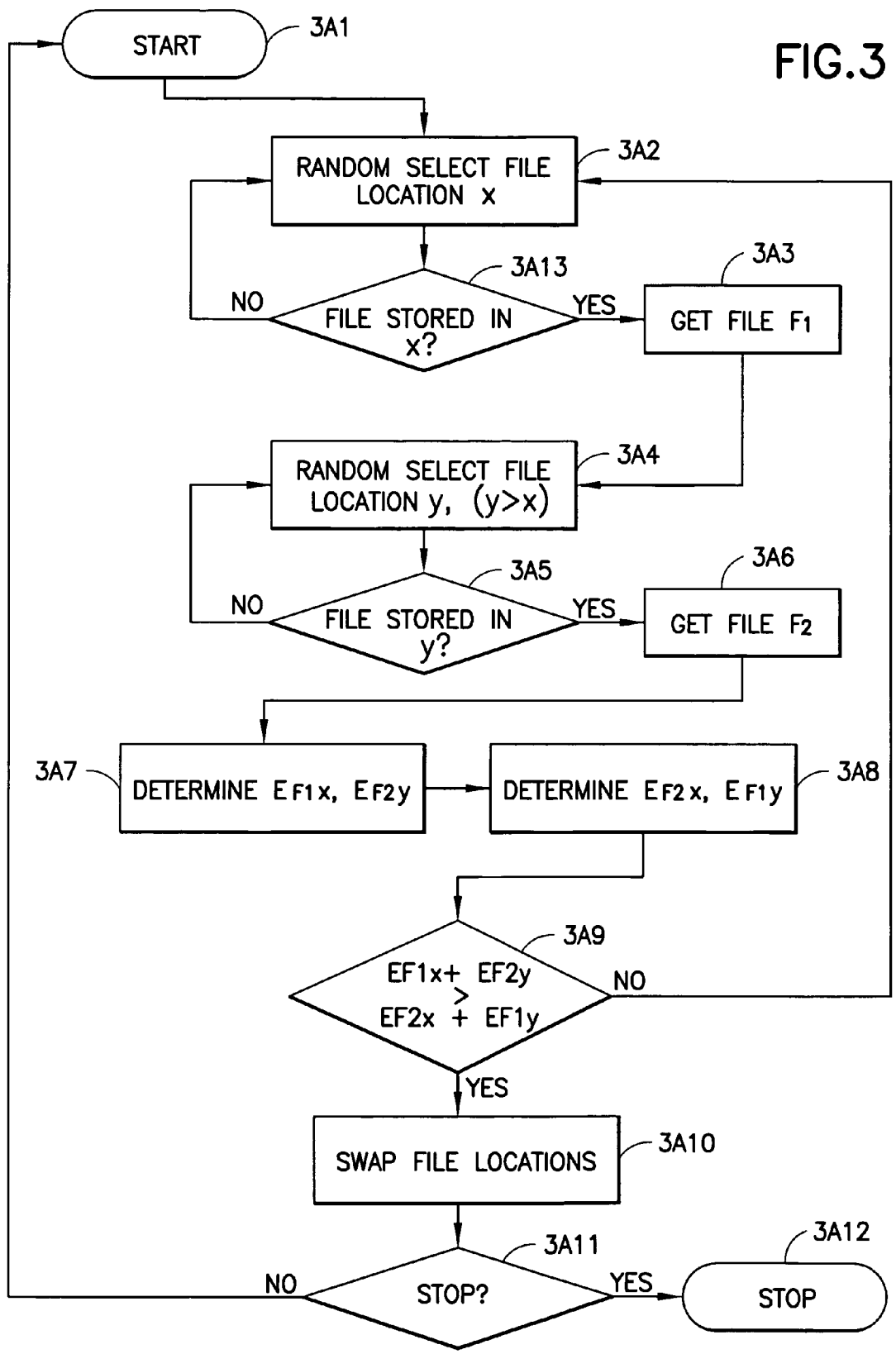
FIG. 3 is a flow chart illustrating method steps for randomly arranging frequently accessed data in memory to optimize power consumption for the system as shown in FIG. 2.

Referring now to FIG. 3 there is shown a flow chart illustrating method steps of an embodiment of the present invention shown in FIG. 2. Step 3A2 randomly selects a memory location x and step 3A13 determines if a file $F_1$ is stored in the randomly selected memory location x. Likewise, steps 3A4 and 3A5 randomly select a second memory location y and determines if a file $F_2$ is stored in the location, respectively. Note that the second randomly selected file location y is greater than x. For example, in a disk based memory storage system x is an inner radius relative to a radius represented by y. Step 3A7 determines the energy required to retrieve $F_1$, while step 3A8 determines the energy required to retrieve $F_2$. Note, that the energy determinations depend at least in part on the number of times each file is accessed. For example, if $F_1$ has been, or is expected to be, retrieved ten times and the energy required to retrieve $F_1$ from memory location x is ten joules then the total energy for retrieving $F_1$ from memory location x is 100 joules. Likewise, if $F_2$ is expected to be retrieved five times and the energy required to retrieve $F_2$ from memory location y is two joules then total energy required to retrieve $F_2$ from memory location y is ten joules. Step 3A7 determines the total energy required to retrieve files $F_1$ and $F_2$ from their current memory locations x and y, respectively. One method of determining power consumption may be determined by assuming e.g., the power distribution can be described by one leading term in the series of Eq. 4 with exponent $\Gamma$:

$$P(j) = nLR^{-\Gamma} \quad \text{(Eq. 5), and}$$

$$dP(j) = LR^{-\Gamma}dn + LR^{-\Gamma}dL - nL\Gamma R^{-\Gamma-1} = nLR^{-\Gamma}(dn/n + dL/L - \Gamma dR/R) \quad \text{(Eq. 6)}$$

It will be appreciated that Eq. 6 is most easily negative when n is large. Thus, an initial assumption at the optimal order is in the order of the n, from smallest to largest.

However, it will be appreciated that in alternate embodiments and suitable method for determining power consumption may be used. In particular, the actual energy profile may be more complex than the case in Eq. 5 and not easily described by a single term. In such a case, an optimal order may be different from that mentioned above; the specific ordering is preferably determined empirically or semi-empirically for each system.

Step 3A8 also determines the total energy that would be required if the location of files F1 and F2 were exchanged. Step 3A10 then exchanges the files if the decision step 3A9 determined that the total energy required to retrieve the files would be less than the energy required to retrieve the files from their current memory locations. Decision step 3A11 determines if the optimization process should stop. In a preferred embodiment the optimization process is during an energy recovery mode such as battery recharging. In alternate embodiments conditions for halting the process could be any suitable condition, such as when charging is finished, when an external power supply is no longer present, or when no exchanges have been made in M tries, where M is a predetermined number.

It will be appreciated that this embodiment is interruption tolerant, or in other words the optimization process may be interrupted at any time.

Figure 4:
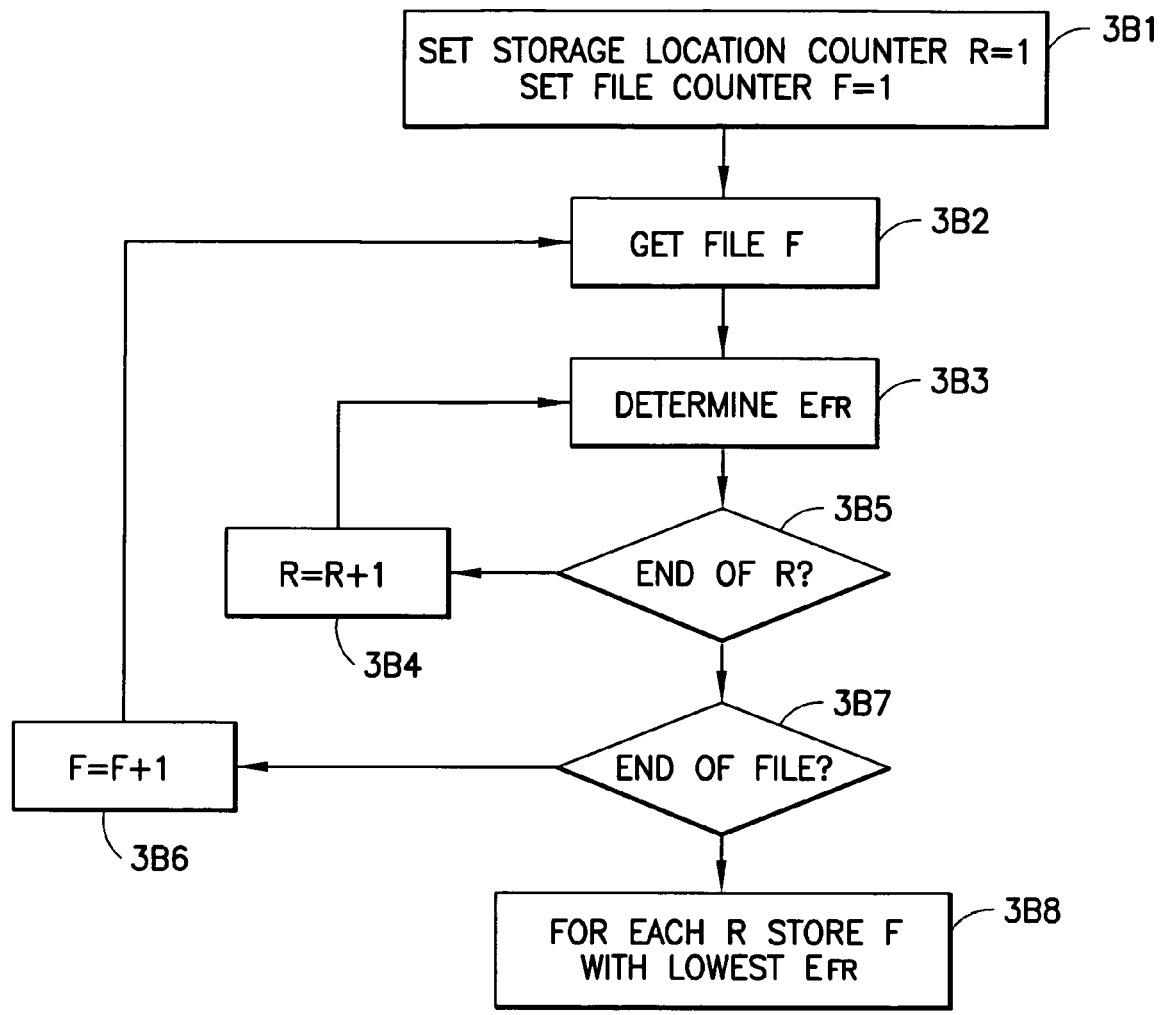
FIG. 4 is a flow chart illustrating method steps for sequentially arranging frequently accessed data in memory to optimize power consumption for the system as shown in FIG. 2.

FIG. 4 is a flow chart illustrating method steps for sequentially arranging frequently accessed data in memory to optimize power consumption. In this embodiment the energy consumption for all the files stored in memory are determined for each memory location. Step 3B1 initializes a storage location counter R and file pointer F. Step 3B2 retrieves file F and step 3B3 determines the energy required (or estimated) to retrieve file F from the memory location indicated by storage location R. Storage location R is then incremented and step 3B3 again determines the energy required to retrieve the file F from the new storage location. This process continues until all the storage locations have an energy retrieval associated with file F. Then step 3B6 increments file F and the process is repeated. Step 3B8 then selects for each storage location R the file F having the lowest energy retrieval associated with that storage location. It will be appreciated that this embodiment is suitable when the number of files is below a predetermined number and/or when the optimization mode is expected to last for a predetermined amount of time, such as overnight charging.

File ordering may be any suitable ordering, such as physical location within the storage medium expressed in terms of radius, access time, or access frequency. Thus, steps 3B1-3B7 may be expressed by the pseudo-code:

Let Ord={1,2,3, . . . }
For y=1:(N−1);
For z=1:(N−1)
dP=P(Ord(z+1))−P(Ord(z));
if dP<0; xx=Ord(z); Ord(z)=Ord(z+1); Ord(z+1)=xx;
end;
end;
end;
Reorder the files by the new Ord vector.

In an alternate embodiment the reordered or optimized files may be organized contiguously by the following method (or simple extensions of it):

Start from file N (the outermost file). If the file is not at the outermost edge of the disk, move it there. This may be expressed by the pseudo-code:
if L(N) is the length of the file and LD*=pointer to last bit on the disk, then
Copy the contents of file F(N) into a buffer or empty part of the drive;
Let x*=LD*−L(N)
Copy the contents from the buffer to x*.
Then repeat the same procedure for all other files so that the files are contiguous from the outer edge of the disk.
Then, consecutive files can be easily swapped if P(z−1)<P(z):
x*=Pointer to start of file F(z−1);
y*=Pointer to start of file F(z);
Read contents of file F(z−1) into a buffer or empty part of the drive;
Write file F(z) to x*
Write file F(z−1) to x*+L(z−1).

This can be repeated as long as desired; the system will slowly saturate towards the optimum energy. Note that this is not necessarily an absolutely optimal solution, since it become unwieldy when file lengths change during access (as with mailbox files).

In this manner, the present invention advantageously decreases the average power consumption of disk memories during the optimization mode. Power reduction is realized by optimizing the location of frequently accessed data files so that power consumption, is minimized.

It should be understood that the foregoing description is only illustrative of the invention. Various alternatives and modifications can be devised by those skilled in the art without departing from the invention. For example, alternative embodiments may include any wireless or non-wireless multimedia products, in which data (e.g., MP3 files or game data) is disk stored. Alternate embodiments may also include any memory device in which power consumption or access time is dependent on physical file location (e.g. closeness to the main data bus). In these alternate embodiments the fundamental teaching of the present invention is used: define a power consumption or access time function E(Fj) for each file, order the files by order frequency nj so that nj*E(Fj) is minimized. Accordingly, the present invention is intended to embrace all such alternatives, modifications and variances that fall within the scope of the appended claims.

What is claimed is:

1. A method comprising:
randomly selecting a first recordable track from a plurality of recordable tracks of a disk based memory;
determining at least one data file metric associated with a data file stored at least in part in the first recordable track;
randomly selecting a second recordable track from the plurality of recordable tracks;

determining whether the second recordable track is a more energy-optimal recordable track to store the data file than the first recordable track based at least in part on the at least one data file metric; and in response to determining that the second recordable track is a more energy-optimal recordable track, writing the data file on the second recordable track.

2. A method as in claim 1 wherein determining the at least one data file metric further comprises gathering file access frequency, where the file access frequency represents file access operations during battery powered operation.

3. A method as in claim 1 wherein determining the at least one data file metric further comprises estimating file access frequency, where the file access frequency represents file access operations during battery powered operation.

4. A method as in claim 1 wherein providing the disk-based memory, the disk-based memory having a plurality of recordable tracks further comprises:

providing at least one recordable track segment having a fixed radius; and providing at least one spiral recordable track having a start and stop radius, $R_{max}$, $R_{min}$, respectively.

5. A method as in claim 1 wherein providing the disk-based memory, the disk-based memory having a plurality, of recordable tracks further comprises providing a plurality of recordable tracks and associated track radii $R_0 \ldots R_m$.

6. A method as in claim 1 wherein providing the disk-based memory; the disk-based memory having a plurality of recordable tracks further comprises providing at least one recordable spiral track and associated start/stop radii $R_{max}$, $R_{min}$, respectively.

7. A method comprising:

randomly selecting a first recordable track from a plurality of recordable tracks of a disk-based memory, where the plurality of recordable tracks are associated with track radii $R_0 \ldots R_m$;

determining a first at least one data file metric associated with a first data file stored at least in part in the first recordable track from the plurality of recordable tracks;

randomly selecting a second recordable track from the plurality, of recordable tracks;

determining a second at least one data file metric associated with a second data file stored at least in part in the second recordable track from the plurality of recordable tracks;

determining a first total energy required to access the first data file in the first recordable track and the second data file in the second recordable track based at least in part on the first at least one data file metric, the second at least one data file metric and the associated track radii;

determining a second total energy required to access the first data file in the second recordable track and the second data file in the first recordable track based at least in part on the first at least one data file metric, the second at least one data file metric and the associated track radii;

determining whether the second total energy is more energy-optimal than the first total energy;

in response to determining that the second total energy is more energy-optimal, exchanging the first data file and the second data file.

8. A method as in claim 7 wherein determining at least one data file metric further comprises retrieving the at least one data file metric from a file allocation table (FAT).

9. A program storage device readable by a machine, tangibly embodying a program of instructions executable by the machine, the program comprising:

randomly selecting a first recordable track from a plurality of recordable tracks of a disk based memory;

determining at least one data file metric associated with a data file stored at least in part in the first recordable track;

randomly selecting, a second recordable track from the plurality of recordable tracks;

determining whether the second recordable track is a more energy-optimal recordable track to store the data file than the first recordable track based at least in part on the at least one data file metric; and in response to determining that the second recordable track is a more energy-optimal recordable track, writing the data file on the second recordable track.

10. The program storage device of claim 9, the program further comprising defragmenting the data file.

11. A device comprising a disk-based memory comprising a plurality of recordable tracks and a processor, where the processor is configured:

to randomly select a first recordable track from a plurality of recordable tracks of a disk based memory;

to determineat least one data file metric associated with a data file stored in the first recordable track;

to randomly select a second recordable track from the plurality of recordable tracks;

to determine whether the second recordable track is a more energy-optimal recordable track to store the data file than the first recordable track based at least in part on the at least one data file metric; and in response to determining that the second recordable track is a more energy-optimal recordable track, to write the data file on the second recordable track.

12. A device as in claim 11 wherein the processor is further configured, when determining the, at least one data file metric, to gather file access frequency, where the file access frequency represents file access operations during battery powered operation.

13. A device as in claim 11 wherein the processor is further configured, when determining the at least one data file metric, to estimate file access frequency, where the file access frequency represents file access operations during battery powered operation.

14. A device as in claim 11 wherein the disk-based memory further comprises:

at least one recordable track segment having a fixed radius; and at least one spiral recordable track having a start and stop radius, $R_{max}$, $R_{min}$, respectively.

15. A device as in claim 11 wherein the disk-based memory further comprises a plurality of recordable tracks and associated track radii $R_0 \ldots R_m$.

16. A device as in claim 11 wherein the disk-based memory further comprises at least one recordable spiral track and associated start/stop radii $R_{max}$, Rmin, respectively.

17. A device comprising a disk-based memory, the disk-based memory having a plurality of recordable tracks, the device comprising:

means for randomly selecting a first recordable track from a plurality of recordable tracks of a disk based memory;

means for determining at least one data file metric associated with a data file stored at least in part in the first recordable track;

means for randomly selecting a second recordable track from the plurality of recordable tracks;

means for determining whether the second recordable track is a more energy-optimal recordable track to store the data file than the first recordable track based at least in part on the at least one data file metric; and means for writing the data file on the second recordable track in response to determining that the second recordable track is a more energy-optimal recordable track.

18. A device as in claim 17, further comprising means for defragmenting the data file.

19. The method of claim 1, wherein the writing the data file further comprises optimizing, in an interruption tolerant manner, the writing the data file.

20. The device of claim 11, wherein the device is configured to be interruption tolerant.

21. The device of claim 17, wherein the means for writing the data file is configured to be interruption tolerant.

\* \* \* \* \*